Figure 1:
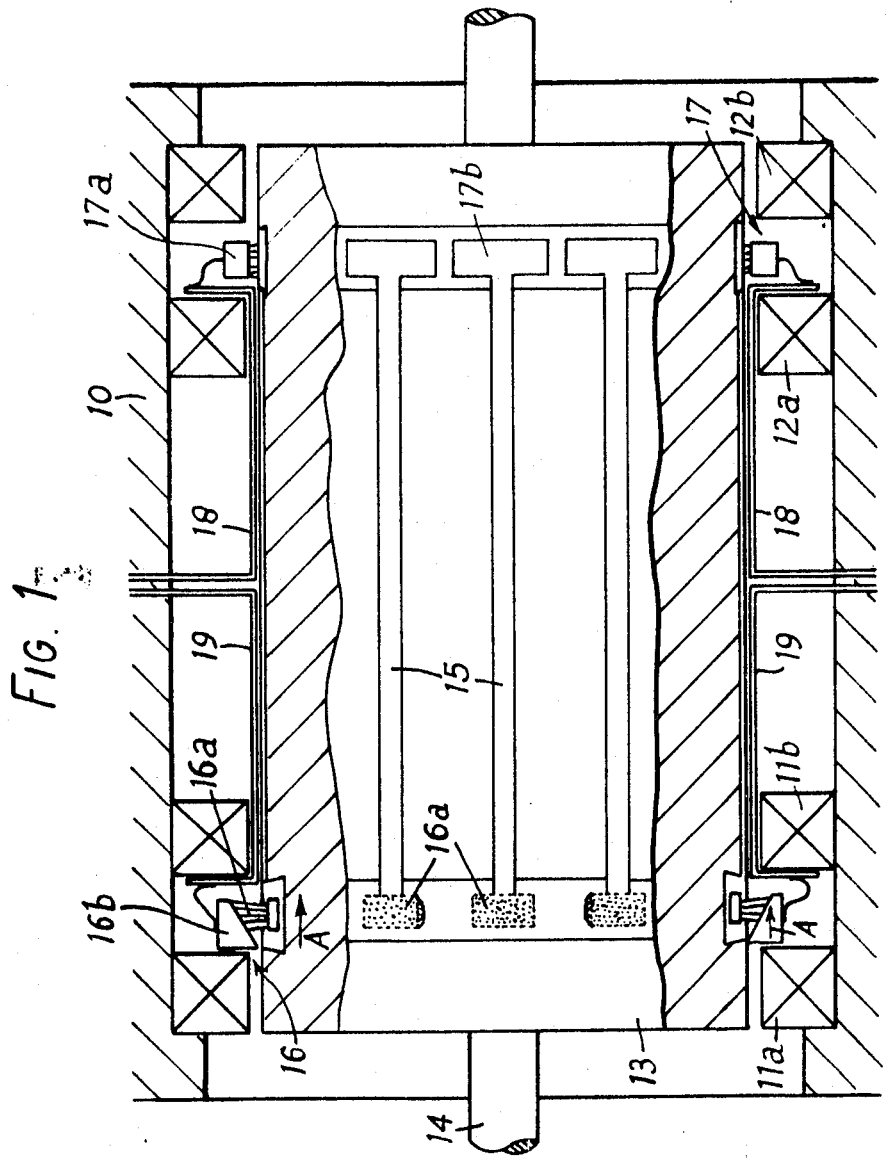

United States Patent
Wilkin et al.

[15] 3,648,088
[45] Mar. 7, 1972

[54] CURRENT TRANSFER DEVICES FOR ELECTRICAL MACHINES

[72] Inventors: Geoffrey Alan Wilkin; Ian Roderick McNab; Anthony Derek Appleton, all of Newcastle, England

[73] Assignee: International Research & Development Company Limited, Fossway, Newcastle upon Tyne, England

[22] Filed: Feb. 5, 1971

[21] Appl. No.: 112,876

[30] Foreign Application Priority Data

Feb. 5, 1970 Great Britain..........................5,643/70

[52] U.S. Cl.............................................310/178, 310/219
[51] Int. Cl........................................................H02k 31/02
[58] Field of Search..................310/138, 231, 219, 239, 178, 310/175

[56] References Cited

UNITED STATES PATENTS

| 1,706,369 | 3/1929 | Williamson | 310/219 |
| 3,073,979 | 1/1963 | Potter | 310/231 |
| 2,347,590 | 4/1944 | Binder | 310/231 UX |
| 2,629,075 | 2/1953 | Deschmann | 310/231 UX |
| 3,128,402 | 4/1964 | Amick, Jr. | 310/178 |
| 3,539,852 | 11/1970 | Appleton et al. | 310/178 |

Primary Examiner—D. F. Duggan
Attorney—Kemon, Palmer & Estabrook

[57] ABSTRACT

Current transfer system for homopolar machines and other electrical machines having a direct current circuit passing from the stator to the rotor by way of a first brush and contact ring set and back from the rotor to the stator by way of a second brush and contact ring set, in which the brushes are on the stator in one set and on the rotor in the other set so that current flow between brushes and contact rings is in the same direction for both sets, preferably from the contact ring to the brush, thereby reducing brush wear.

6 Claims, 2 Drawing Figures

CURRENT TRANSFER DEVICES FOR ELECTRICAL MACHINES

This invention relates to current transfer in dynamo-electric machines and is concerned particularly with machines in which current transfer takes place between brushes of electrically conducting material and contact surfaces of electrically conducting material, there being relative rotation between the brushes and the contact surfaces, and the direction of current flow between each brush and the associated contact surface remains constant. Typical of such machines are homopolar machines and synchronous electrical machines where, for example, a direct current is fed through brushes into slip rings on a rotor to provide excitation for a field winding mounted on the rotor.

The problems presented by brush wear and electrical losses on homopolar machines are acute because of the high currents which are transmitted by the current transfer brushes. Brush wear can also be a problem in large turbogenerators where high currents need to be transferred at high rotational speeds.

In accordance with the present invention there is provided a dynamoelectric machine comprising a rotor and a stator, a direct current circuit extending from the stator to the rotor and back to the stator, first current transfer means in the said circuit for conveying current from the stator to the rotor, and second current transfer means in said circuit for conveying current from the rotor to the stator, each of the current transfer means comprising at least one brush and a contact surface movable relative to and cooperating with said brush for the transfer of current therebetween, the brush of the first transfer means and the contact surface of the second transfer means being mounted on the rotor and the brush of the second transfer means and the contact surface of the first transfer means being mounted on the stator, whereby the direction of current flow between the brush and the contact surface is the same for each of the current transfer means.

Preferably the direction of current flow is from the contact surface into the brush, that is electrons pass from the brush to the contact surface.

It is found that this arrangement of the brushes and contact surfaces results in reduced brush wear.

The contact surfaces may be in the form of continuous slip rings or may be composed of individual mutually insulated segments. The brushes may be of carbon and may be arranged individually around a contact surface or form a substantially continuous ring. The brushes may be composed of arrays of carbon fibers either in the form of individual brushes or as a continuous ring.

To allow for wear the contact surfaces may be frustoconical and be urged under a spring force in a direction transverse to the contact face of the brush, the movement being in a direction such that any gap forming between the brush and the surface is taken up.

Figure 2:
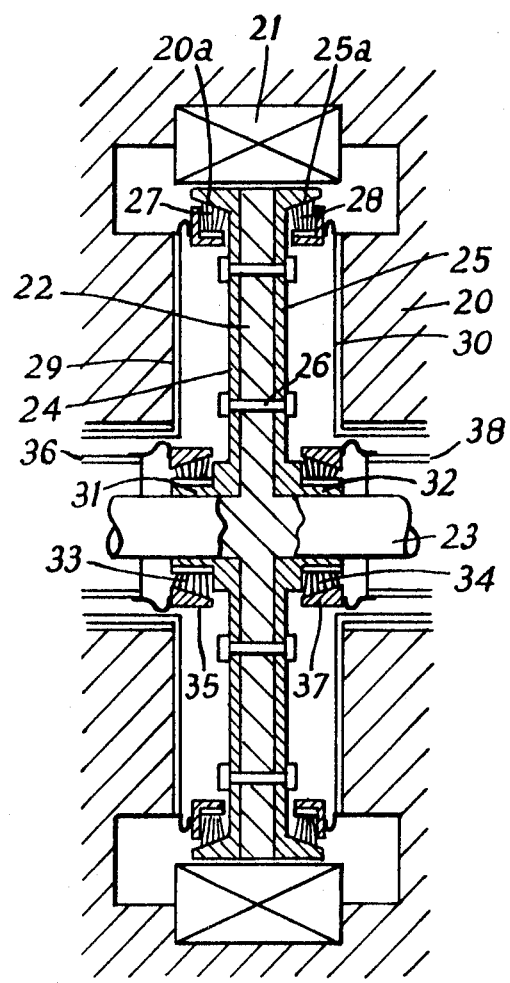

The invention will now be described in more detail with the aid of examples illustrated in the accompanying drawings, in which:

FIG. 1 is a section of a homopolar electrical machine having a drum type rotor and current transfer means in accordance with the invention, and FIG. 2 is a section of a homopolar machine with a disc rotor and current transfer means in accordance with the invention.

The homopolar electrical machine shown in FIG. 1 has a stator 10 which carries a first field coil composed of parts 11a and 11b and a second field coil composed of parts 12a and 12b. The field coils can be of superconducting material in which case they are enclosed in a cryogenic envelope in a conventional manner to maintain the low operating temperature which is required. In the case of superconducting coils no magnetic core is required on the stator. Alternatively the field coils can be of normal conducting material and in this case are disposed in a magnetic core on the stator 10 in conventional manner. The machine has a drum motor 13 which rotates within the stator on a shaft 14 and which carries on its periphery conducting paths 15 formed by a plurality of individual conductors extending axially of the rotor 13. Alternatively the rotor may carry a single conducting path consisting of a continuous cylindrical sleeve on the surface of the rotor.

At the ends of the conducting paths 15 on the rotor 13 there are current transfer devices 16 and 17 which serve to transfer current between the stator 10 and the conducting paths on the rotor 13. The current transfer device 16 comprises a plurality of carbon brushes 16a mounted on the rotor for rotation with the rotor. The brushes 16a, each of which is composed of an assembly of carbon fibers, can form a complete ring extending substantially continuously around the periphery of the rotor. The current transfer device 16 also comprises a frustoconical contact ring 16b which is mounted on the stator 10 between the parts 11a and 11b of the field coil. The contact ring 16b is biassed in the direction of the arrows A by a spring (not shown) so that brush wear is compensated for by axial movement of the contact ring.

The current transfer device 17 comprises a number of brushes 17a mounted on the stator 10 and engaging a contact surface composed of a ring of contact segments 17b on the rotor. Each of the contact segments 17b is connected to one end of a rotor conductor 15, whose other end is connected to one of the brushes 16a. The contact segments 17b are mutually insulated from one another. The brushes 17a are located between the two parts 12a and 12b of the field coil on the stator 10.

The brushes 17a on the stator are connected by leads 18 to one terminal of the machine while the contact ring 16b is connected by leads 19 to the other terminal of the machine. Current flow thus proceeds from this other terminal through the leads 19 to the contact ring 16b and thence into the brushes 16a. It then flows through the rotor conductors to the contact segments 17b and from them into the brushes 17a and by way of leads 18 to the external circuit. In each of the current transfer devices the current flow is from the contact surface into the brush and it is found that the electrical losses and brush wear rate are considerably improved over arrangements in which the direction of current flow is different in each current transfer device.

In an alternative arrangement the direction of current flow is reversed but again the direction of flow is the same in both current transfer devices. The arrangement is applicable to machines acting as motors or generators.

The contact segments 17b are shown as presenting a cylindrical contact surface and the brushes 17a are biassed against this surface in a radial direction in conventional manner. It is of course possible to use a frustoconical contact surface in the transfer device 17 as in the device 16 and to bias the brushes axially against the contact surface. Whereas the brushes 16a and 17a are composed of carbon fibers in the embodiment shown, and these fibers can be metal coated, it is also possible to use conventional carbon block brushes.

FIG. 2 shows the application of the invention to a homopolar machine with a disc rotor. The machine has a stator 20 which supports a superconducting field coil 21. A rotor support disc 22 is carried by a shaft 23 which is mounted in bearings (not shown) in the stator. On either side of the support disc 22 are conducting disc 24 and 25, for example of copper, which are secured by studs 26. The outer periphery of each of the discs 24 and 25 has a flange which presents a contact surface 24a and 25a, respectively, of frustoconical form towards the rotor axis. These contact surfaces 24a and 25a are engaged by stationary brushes 27 and 28, respectively, which are mounted on the stator structure 20 and are connected to the external circuit by conductors 29 and 30, respectively.

The inner regions of the discs 24 and 25 have cylindrical extensions 31 and 32, respectively, which house brushes 33 and 34, respectively. The brushes 33 engage a fixed contact ring 35 which is connected to the external circuit by conductors 36. The brushes 34 engage a fixed contact ring 37 which is connected to the external circuit by conductor 38.

The two discs 24 and 25 are connected in separate circuits each of which includes two current transfer devices, one for transferring current from the stator to the rotor and one for transferring the current from the rotor to the stator and in each circuit the direction of current flow is the same for each current transfer device. Thus one circuit runs from the contact ring 35 to the brushes 33, through the disc 24 to the contact surface 24a and thence to the brushes 27. The other circuit is from the contact ring 37 to the brushes 34, through the disc 25 to the contact surface 25a and thence to the brushes 28.

Each of the brushes 33 and 34 which rotate with the rotor may be a continuous ring of carbon in solid or fiber form or may be composed of several discrete brushes. The contact rings 35 and 37 may be urged in an axial direction by springs (not shown) to compensate for brush wear.

The attitude of the interface between each set of brushes and the associated contact surface is preferably arranged to follow the direction of the magnetic field lines in that region in order to avoid a voltage being developed across the interface.

If the discs 24 and 25 are segmented as described in our U.S. Pat. No. 3,497,739, each rotor disc will be divided up into separate mutually insulated radial conducting paths each connected to a separate insulated segment on the outer flange and on the inner cylindrical extension. The brushes will be discrete brushes spaced by at least one segment width around the outer flange and inner cylindrical extension. The electrical connections will be such as to connect selected conducting paths in series as the rotor rotates. The contact rings 35 and 37 will also be segmented with insulation between the conducting segments.

The brushes may be held in position by conventional brush holders or if fiber brushes are used the arrays or bundles of fibers can be held in crimped tubes.

Whilst the invention has been described with particular reference to homopolar machines it can also be applied to synchronous machines where direct current is transferred through slip-rings to a rotor winding.

Whilst carbon brushes have been described other brush materials can be used such as metal brushes, composite metal-graphite brushes or metal such as silver with molybdenum disulphide.

We claim:

1. A dynamoelectric machine comprising a rotor and a stator, a direct current circuit extending from the stator to the rotor and back to the stator, first current transfer means in the said circuit for conveying current from the stator to the rotor, and second current transfer means in said circuit for conveying current from the rotor to the stator, each of the current transfer means comprising at least one brush and a contact surface movable relative to and cooperating with said brush for the transfer of current therebetween, the brush of the first transfer means and the contact surface of the second transfer means being mounted on the rotor and the brush of the second transfer means and the contact surface of the first transfer means being mounted on the stator, whereby the direction of current flow between the brush and the contact surface is the same for each of the current transfer means.

2. A dynamoelectric machine as claimed in claim 1 wherein the direction of current flow in the direct current circuit is from the contact surface into the brush.

3. A dynamoelectric machine as claimed in claim 1 in which each of the contact surfaces comprises a plurality of mutually insulated electrically conductive segments.

4. A dynamoelectric machine as claimed in claim 1 in which each brush comprises a block of carbon.

5. A dynamoelectric machine as claimed in claim 1 in which each brush comprises an array of carbon fibers.

6. A dynamoelectric machine as claimed in claim 1 in which the contact surfaces are frustoconical and are biassed against the brushes by force applying means acting in a direction transverse to the brushes.

* * * * *